United States Patent
Zhou et al.

(10) Patent No.: US 10,312,809 B2
(45) Date of Patent: Jun. 4, 2019

(54) CONVERTER CIRCUIT FOR CONVERTING DIRECT CURRENT TO DIRECT CURRENT AND LIQUID CRYSTAL DISPLAY USING THE SAME

(71) Applicant: Shenzhen China Star Optoelectronics Technology Co., Ltd., Shenzhen, Guangdong (CN)

(72) Inventors: Li Zhou, Guangdong (CN); Dan Cao, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 283 days.

(21) Appl. No.: 15/303,803

(22) PCT Filed: Sep. 9, 2016

(86) PCT No.: PCT/CN2016/098558
§ 371 (c)(1),
(2) Date: Oct. 13, 2016

(87) PCT Pub. No.: WO2018/006492
PCT Pub. Date: Jan. 11, 2018

(65) Prior Publication Data
US 2018/0183329 A1    Jun. 28, 2018

(30) Foreign Application Priority Data

Jul. 2, 2016   (CN) .......................... 2016 1 0511901

(51) Int. Cl.
*G05F 3/06*     (2006.01)
*H02M 3/158*    (2006.01)
(Continued)

(52) U.S. Cl.
CPC ............. *H02M 3/158* (2013.01); *H02M 1/08* (2013.01); *H02M 3/155* (2013.01); *H02M 2001/0009* (2013.01)

(58) Field of Classification Search
CPC .................. H02M 1/08; H02M 3/155; H02M 2001/0009; H02M 3/158
See application file for complete search history.

(56) References Cited

U.S. PATENT DOCUMENTS

2009/0302816 A1* 12/2009 Kunimatsu ............. H02M 1/36
                                                              323/282
2010/0026393 A1*  2/2010 Keerti ....................... H03F 1/56
                                                              330/302
(Continued)

FOREIGN PATENT DOCUMENTS

CN       102386773 A      3/2012
CN       102388528 A      3/2012
(Continued)

*Primary Examiner* — Alfonso Perez Borroto
*Assistant Examiner* — Esayas G Yeshaw
(74) *Attorney, Agent, or Firm* — Andrew C. Cheng

(57) ABSTRACT

The present invention provides a direct current to direct current converter circuit, which comprises: a first energy storage module, a second energy storage module, a current regulator module, and a current detection module. The first energy storage module outputs current via the second energy storage module; the current detection module detects the value of outputting current of the second energy storage module, and sends feedback signals in accordance with the value of outputting current of the second energy storage module; and the current regulator module receives the feedback signals, and regulates the peak value of outputting current of the first energy storage module in accordance with the feedback signals. Thereby the direct current to direct (Continued)

current converter circuit can achieve the purpose of controlling the values of the outputting current and improving the efficiency and stability.

17 Claims, 2 Drawing Sheets

(51) Int. Cl.
*H02M 3/155* (2006.01)
*H02M 1/08* (2006.01)
*H02M 1/00* (2006.01)

(56) References Cited

U.S. PATENT DOCUMENTS

| | | | |
|---|---|---|---|
| 2013/0026828 A1* | 1/2013 | Iwami | G01R 31/3679 307/10.1 |
| 2013/0169038 A1* | 7/2013 | King | H02J 7/0031 307/10.1 |
| 2015/0023070 A1* | 1/2015 | Nate | H02M 3/33507 363/21.17 |
| 2015/0138846 A1* | 5/2015 | Yau | H02M 3/33507 363/21.04 |
| 2016/0268890 A1* | 9/2016 | Ayai | H02M 3/156 |
| 2018/0015833 A1* | 1/2018 | Namou | B60L 11/1811 |

FOREIGN PATENT DOCUMENTS

| | | |
|---|---|---|
| CN | 202978709 U | 6/2013 |
| CN | 104578800 A | 4/2015 |
| JP | 2006333555 A | 12/2006 |
| TW | I390828 B | 2/2013 |

\* cited by examiner

CONVERTER CIRCUIT FOR CONVERTING DIRECT CURRENT TO DIRECT CURRENT AND LIQUID CRYSTAL DISPLAY USING THE SAME

FIELD OF THE INVENTION

The present invention relates to a technology of liquid crystal display, and more particularly, to a converter circuit for converting direct current to direct current and a liquid crystal display using the same.

DESCRIPTION OF PRIOR ART

In conventional liquid crystal display (LCD), various voltages used by LCD are generated by using a converter circuit to convert direct current to direct current(DC to DC.)There are three types of DC to DC converter circuit: a boost DC to DC converter circuit, a buck DC to DC converter circuit and a buck-boost DC to DC converter circuit. For example, a boost DC to DC converter circuit can achieve a stable output voltage by a boost circuit, a feedback circuit and a feedback control circuit of its own.

However, outputting current of conventional DC to DC converter circuit is affected by working loads. When the working loads change, the value of outputting current of DC to DC converter circuit changes also as the working loads change. For example, when working loads connected to the DC to DC converter circuit is increased and output voltage of the converter circuit remains unchanged, the value of the output voltage of the converter circuit is increased, so as a loss of the converter circuit is increased and efficiency of the converter circuit is low, and stability of loop configured by the DC to DC converter circuit and working loads is also to be deteriorated.

Thus, a new DC to DC converter circuit needs to be developed, in order to resolve the problems described above.

SUMMARY OF THE INVENTION

Purpose of the present invention is to provide a DC to DC converter circuit, which can improve the efficiency and stability by controlling the values of an outputting current.

In order to achieve the purpose, the present invention provides a DC to DC converter circuit, which comprises: a first energy storage module, a second energy storage module, a current regulator module, and a current detection module. The first energy storage module outputs current via the second energy storage module; the current detection module detects the value of outputting current of the second energy storage module, and sends feedback signals in accordance with the value of outputting current of the second energy storage module; and the current regulator module receives the feedback signals, and regulates the peak value of outputting current of the first energy storage module in accordance with the feedback signals.

The current regulator module comprises a first controller and a switch module. A first connecting port of the switch module is connected to an input of the second energy storage module and a second connecting port of the switch module is connected to a ground. The first controller receives the feedback signals and further controls the switching frequency of the switch module in accordance with the feedback signals, so as to control the charging and discharging time of the first energy storage module to regulate the peak value of outputting current of the first energy storage module.

When the value of outputting current of the second energy storage module is less than a predetermined threshold value, then the current detection module outputs a first feedback signal treated as the feedback signal. The first controller receives the first feedback signal and increases the switching frequency of the switch module in accordance with the first feedback signal, so as to control the first energy storage module to reduce its charging and discharging time, and the peak value of outputting current of the first energy storage module can be reduced.

When the value of outputting current of the second energy storage module is larger than the predetermined threshold value, then the current detection module outputs a second feedback signal treated as the feedback signal. The first controller receives the second feedback signal and reduces the switching frequency of the switch module in accordance with the second feedback signal, so as to control the first energy storage module to increase its charging and discharging time, and the peak value of outputting current of the first energy storage module can be increased.

When the value of outputting current of the second energy storage module is equal to the predetermined threshold value, then the current detection module outputs a third feedback signal treated as the feedback signal. The first controller receives the third feedback signal and remains the switching frequency of the switch module unchanged in accordance with the third feedback signal, so as to control the first energy storage module to keep its charging and discharging time unchanged, and the peak value of outputting current of the first energy storage module can be remained unchanged.

The current regulator module comprises a second controller and a current limiting module, and the current limiting module is interposed between the first and second energy storage modules. Wherein the second controller receives the feedback signals and further controls the current limiting module to regulate the peak value of outputting current of the first energy storage module in accordance with the feedback signals.

When the value of outputting current of the second energy storage module is less than a predetermined threshold value, then the current detection module outputs a first feedback signal treated as the feedback signal. The second controller receives the first feedback signal and the current limiting module reduces the peak value of outputting current of the first energy storage module in accordance with the first feedback signal.

When the value of outputting current of the second energy storage module is larger than the predetermined threshold value, then the current detection module outputs a second feedback signal treated as the feedback signal. The second controller receives the second feedback signal and the current limiting module increases the peak value of outputting current of the first energy storage module in accordance with the second feedback signal.

When the value of outputting current of the second energy storage module is equal to the predetermined threshold value, then the current detection module outputs a third feedback signal treated as the feedback signal. The second controller receives the third feedback signal and the current limiting module remains the peak value of outputting current of the first energy storage module in accordance with the third feedback signal.

The first energy storage module comprises an inductor.

The second energy storage module comprises a first Zener diode and a capacitor; an anode of the first Zener diode is connected to the output of the first energy storage module;

and a first connecting port of the capacitor is connected to the cathode of the first Zener diode and a second connecting port of the capacitor is connected to a ground.

The switch module comprises a first field effect transistor.

The current limiting module comprises a plurality of current limiting units. The second controller turns on one of the plurality of current limiting units in accordance with the feedback signals and turns off others, so as to regulate the peak value of outputting current of the first energy storage module. Different current limiting units can allow different peak values to pass through. Each current limiting module has a first connecting port and a second connecting port, and the first connecting port of each current limiting module is connected to an output of the first energy storage module and the second connecting port of each current limiting module is connected to an input of the second energy storage module.

Any one of the current limiting unit comprises a second field effect transistor, a first resistor, a second resistor, a transistor and a second Zener diode; the second controller is connected to a gate of the second field effect transistor to control the second field effect transistor to be turned on or off; a source of the second field effect transistor is connected to an output of the first energy storage module; a drain of the second field effect transistor is connected to a first connecting port of the second resistor and a collector of the transistor; a second connecting port of the second resistor is connected to a base of the transistor and an anode of the second Zener diode; an emitter of the transistor is connected to a first connecting port of the first resistor; and a second connecting port of the first resistor is connected to a cathode of the second Zener diode and an input of the storage second module.

The present invention provides a DC to DC converter circuit, by the current detection module detecting the value of outputting current of the second energy storage module and sending feedback signals, the current regulator module receives the feedback signals and regulates the peak value of outputting current of the first energy storage module in accordance with the feedback signals. Thereby achieving the purpose of controlling the values of the outputting current and improving the efficiency and stability.

DESCRIPTION OF PREFERRED EMBODIMENT

Preferred embodiments of the present invention will be detailedly described here below. Referring to FIGS. 1-5, which are illustrational views of a DC to DC converter circuit made in accordance to the embodiment of the present invention. Wherein the DC to DC converter circuit can be used in liquid crystal display according to the embodiment of the present invention.

Figure 1:
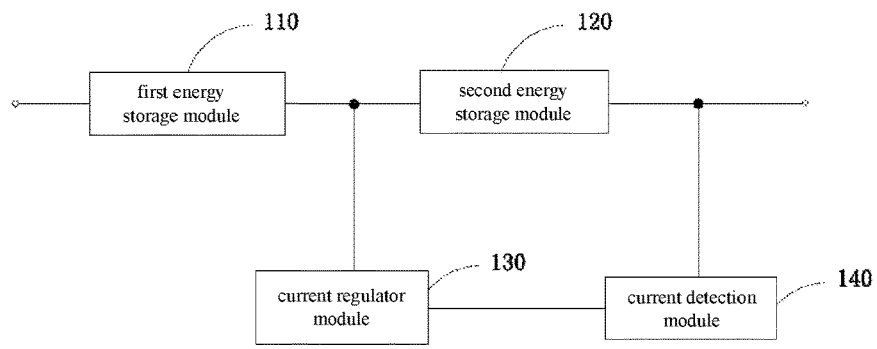
FIG. 1 is an illustrational view of a DC to DC converter circuit made in accordance to the embodiment of the present invention.

FIG. 1 is an illustrational view of a DC to DC converter circuit made in accordance to the embodiment of the present invention;

Referring to FIG. 1, the DC to DC converter circuit of the embodiment of the present invention, which comprises: a first energy storage module 110, a second energy storage module 120, a current regulator module 130, and a current detection module 140.

The first energy storage module 110 outputs current via the second energy storage module 120; the current detection module 140 detects the value of outputting current of the second energy storage module 120, and sends feedback signals in accordance with the value of outputting current of the second energy storage module 120; and the current regulator module 130 receives the feedback signals, and regulates the peak value of outputting current of the first energy storage module 110 in accordance with the feedback signals.

Preferably, the first energy storage module 110 comprises an inductor.

It should be noted that the outputting current of the second energy storage module 120 is a current which is output from the DC to DC converter circuit (e.g., a working load.) When the working load changes and output voltage of the converter circuit remains unchanged, the value of outputting current changes corresponding to the working load changing. In this case, the current detection module 140 detects the changing of the value of outputting current of the second energy storage module 120, and sending feedback signals corresponding to the value of outputting current of the second energy storage module 120.

Specifically, when the working load is reduced, the detected value of outputting current of the second energy storage module 120 is less than a predetermined threshold value, then the current detection module 140 outputs a first feedback signal treated as the feedback signal; when the working load is increased, the detected value of outputting current of the second energy storage module 120 is larger than the predetermined threshold value, then the current detection module 140 outputs a second feedback signal treated as the feedback signal; in normal case, the detected value of outputting current of the second energy storage module 120 is equal to the predetermined threshold value, then the current detection module 140 outputs a third feedback signal treated as the feedback signal.

The value of outputting current of DC to DC converter circuit can be calculated by the following formula (1):

$$Io = (1-D)\left(Ipk - Vi \times \frac{D}{2Lf}\right) \quad (1)$$

In the formula (1), $I_o$ is the value of outputting current of DC to DC converter circuit (i.e., the value of outputting current of the second energy storage module 120;) D is the duty cycle; $I_{pk}$ is the peak value of outputting current of the first energy storage module (i.e., the peak of inductor current of the inductor;) $V_i$ is the input voltage; L is the inductance value of the inductor; and F is the switching frequency.

The DC to DC converter circuit of the embodiment of the present invention, because of the input voltage $V_i$ and output voltage are fixed values, so the duty cycle D is also a fixed value. Then the value of outputting current $I_o$ and the switching frequency f are corresponding to the peak value of outputting current of the first energy storage module 110. Therefore, by controlling the current regulator module 130 to change the switching frequency f and/or the peak value of outputting current of the first energy storage module 110, the value of outputting current of DC to DC converter circuit $I_o$ can be controlled.

Referring to FIGS. 2~5, in the preferred embodiment to be described here below, controlling the current regulator module 130 to change the switching frequency f and/or the peak value of outputting current of the first energy storage module 110, the value of outputting current of DC to DC converter circuit $I_o$ can be controlled.

Figure 2:
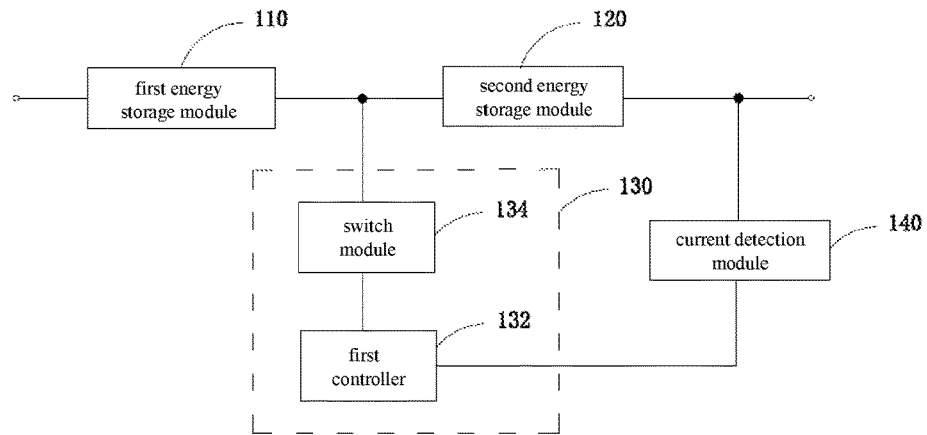
FIG. 2 is an illustrational view of a DC to DC converter circuit made in accordance to the embodiment of the FIG. 1.

FIG. 2 is an illustrational view of a DC to DC converter circuit made in accordance to the embodiment of the FIG. 1.

Referring to FIG. 2, the embodiment provides a DC to DC converter circuit, which comprises: a first energy storage module 110, a second energy storage module 120, a current regulator module 130, and a current detection module 140. Specifically, the current regulator module 130 comprises a first controller 132 and a switch module 134.

The first energy storage module 110, the second energy storage module 120, the current regulator module 130, and the current detection module 140 as shown in FIG. 2, are the same as which shown in FIG. 1, therefore no additional description is given here below.

A first connecting port of the switch module 134 is connected to an input of the second energy storage module 120 and a second connecting port of the switch module 134 is connected to a ground. The first controller 132 is connected to an input of the switch module 134 to control the switching frequency of the switch module 134.

The first controller 132 receives the feedback signals and further controls the switching frequency of the switch module 134 in accordance with the feedback signals, so as to control the charging and discharging time of the first energy storage module 110 to regulate the peak value of outputting current of the first energy storage module 110.

Here below, the period of the charging and discharging time of the first energy storage module 110 is proportional to the peak value of outputting current of the first energy storage module 110, i.e., if the charging and discharging time of the first energy storage module 110 was increased, the peak value of outputting current of the first energy storage module 110 is increased; if the charging and discharging time of the first energy storage module 110 was reduced, the peak value of outputting current of the first energy storage module 110 is reduced; if the charging and discharging time of the first energy storage module 110 remained unchanged, the peak value of outputting current of the first energy storage module 110 remains unchanged;

It should be noticed that, the switching frequency of the switch module 134 is the same as the frequency of the charging and discharging time of the first energy storage module 110, and the frequency of the charging and discharging time of the first energy storage module 110 is inversely proportional to the period of the charging and discharging time of the first energy storage module 110, because of the duty cycle is a fixed value, then the switching frequency is inversely proportional to each charge and discharge time in the period of the charging time and discharging time. In this case, if the switching frequency was increased, the frequency of the charging and discharging time of the first energy storage module 110 is increased, then the peak value of outputting current of the first energy storage module 110 is reduced; if the switching frequency was reduced, the frequency of the charging and discharging time of the first energy storage module 110 is reduced, then the peak value of outputting current of the first energy storage module 110 is increased; if the switching frequency remained unchanged, the frequency of the charging and discharging time of the first energy storage module 110 remains unchanged, then the peak value of outputting current of the first energy storage module 110 remains unchanged.

In the preferred embodiment to be described here below, changing the switching frequency to regulate the peak value of outputting current of the first energy storage module, so as to control the value of outputting current of DC to DC converter circuit.

When the value of outputting current of the second energy storage module 120 is less than a predetermined threshold value, the current detection module 140 outputs a first feedback signal treated as the feedback signal; the first controller 132 receives the first feedback signal and increases the switching frequency of the switch module 134 in accordance with the first feedback signal, so as to control the first energy storage module 110 to reduce its charging and discharging time, then the peak value of outputting current of the first energy storage module 110 can be reduced. I.e., increasing the switching frequency f in formula (1) resulted in reducing the peak value of outputting current $I_{pk}$ of the first energy storage module, then $$Ipk - Vi \times \frac{D}{2Lf}$$

is reduced, so as to reduce the value of outputting current $I_o$ of DC to DC converter circuit.

When the value of outputting current of the second energy storage module 120 is larger than a predetermined threshold value, the current detection module 140 outputs a second feedback signal treated as the feedback signal; the first controller 132 receives the second feedback signal and reduces the switching frequency of the switch module 134 in accordance with the second feedback signal, so as to control the first energy storage module 110 to increase its charging and discharging time, then the peak value of outputting current of the first energy storage module 110 can be increased. I.e., reducing the switching frequency f in formula (1) resulted in increasing the peak value of outputting current $I_{pk}$ of the first energy storage module, then $$Ipk - Vi \times \frac{D}{2Lf}$$

is increased, so as to increase the value of outputting current $I_o$ of DC to DC converter circuit.

When the value of outputting current of the second energy storage module 120 is equal to the predetermined threshold value, the current detection module 140 outputs a third feedback signal treated as the feedback signal; the first controller 132 receives the third feedback signal and remains the switching frequency of the switch module 134 in accordance with the third feedback signal, so as to control the first energy storage module 110 to keep its charging and discharging time unchanged, then the peak value of outputting current of the first energy storage module 110 can remain unchanged. I.e., the switching frequency f in formula (1) remains unchanged and the peak value of outputting current $I_{pk}$ of the first energy storage module keeps unchanged, so as to keep the value of outputting current $I_o$ of DC to DC converter circuit unchanged.

Figure 3:
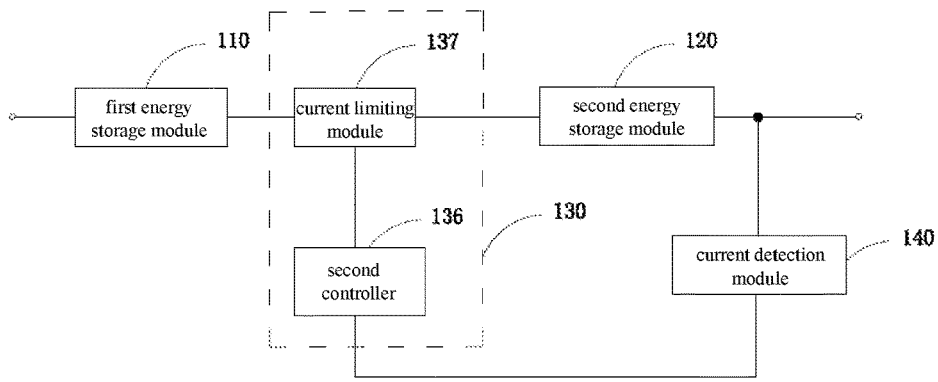
FIG. 3 is an illustrational view of a DC to DC converter circuit made in accordance to anther embodiment of the FIG. 1.

FIG. 3 is an illustrational view of a DC to DC converter circuit made in accordance to anther embodiment of the FIG. 1;

Referring to FIG. 3, the embodiment provides a DC to DC converter circuit, which comprises: a first energy storage module 110, a second energy storage module 120, a current regulator module 130, and a current detection module 140. Specifically, the current regulator module 130 comprises a second controller 136 and a switch module 137.

The first energy storage module 110, the second energy storage module 120, the current regulator module 130, and the current detection module 140 as shown in FIG. 3, are the same as which shown in FIG. 1, therefore no additional description is given here below.

The current limiting module 137 is interposed between the first energy storage module 110 and second energy storage module 120. The second controller 136 receives the feedback signals and further controls the current limiting module 137 to regulate the peak value of outputting current of the first energy storage module 110 in accordance with the feedback signals.

The current limiting module 137 comprises a plurality of current limiting units. Different current limiting units can allow different peak values to pass through, i.e., the first energy storage module 110 can output different peak value of outputting current via different current limiting units. Each current limiting module has a first connecting port and a second connecting port, and the first connecting port of each current limiting module is connected to an output of the first energy storage module 110 and the second connecting port of each current limiting module is connected to an input of the second energy storage module 120.

In the preferred embodiment to be described here below, regulating the peak value of outputting current of the first energy storage module to control the value of outputting current of DC to DC converter circuit.

When the value of outputting current of the second energy storage module 120 is less than a predetermined threshold value, then the current detection module 140 outputs a first feedback signal treated as the feedback signal; the second controller 136 receives the first feedback signal and the current limiting module 137 reduces the peak value of outputting current of the first energy storage module 110 in accordance with the first feedback signal. I.e., when the value of outputting current is less than the predetermined threshold value, the second controller 136 turns on a current limiting module allowed less peak value of current to pass through than the existing one, so as to reduce the peak value of outputting current of the first energy storage module 110 via the current limiting module. Then, the switching frequency f in formula (1) remains unchanged and the peak value of outputting current $I_{pk}$ of the first energy storage module is reduced, so as to reduce the value of outputting current $I_o$ of DC to DC converter circuit.

When the value of outputting current of the second energy storage module 120 is larger than the predetermined threshold value, then the current detection module 140 outputs a second feedback signal treated as the feedback signal; the second controller 136 receives the second feedback signal and the current limiting module 137 increases the peak value of outputting current of the first energy storage module 110 in accordance with the second feedback signal. I.e., when the value of outputting current is larger than the predetermined threshold value, the second controller 136 turns on a current limiting module allowed large peak value of current to pass through than the existing one, so as to increase the peak value of outputting current of the first energy storage module 110 via the current limiting module. Then, the switching frequency f in formula (1) remains unchanged and the peak value of outputting current $I_{pk}$ of the first energy storage module is increased, so as to increase the value of outputting current $I_o$ of DC to DC converter circuit.

When the value of outputting current of the second energy storage module 120 is equal to the predetermined threshold value, then the current detection module 140 outputs a third feedback signal treated as the feedback signal; the second controller 136 receives the third feedback signal and the current limiting module 137 remains the peak value of outputting current of the first energy storage module 110 unchanged in accordance with the third feedback signal. I.e., when the value of outputting current is equal to the predetermined threshold value, the second controller 136 remains to turn on the existing current limiting module, so as to remain the peak value of outputting current of the first energy storage module 110 via the current limiting module unchanged. Then, the switching frequency f in formula (1) remains unchanged and the peak value of outputting current $I_{pk}$ of the first energy storage module keeps unchanged, so as to keep the value of outputting current $I_o$ of DC to DC converter circuit unchanged.

Figure 4:
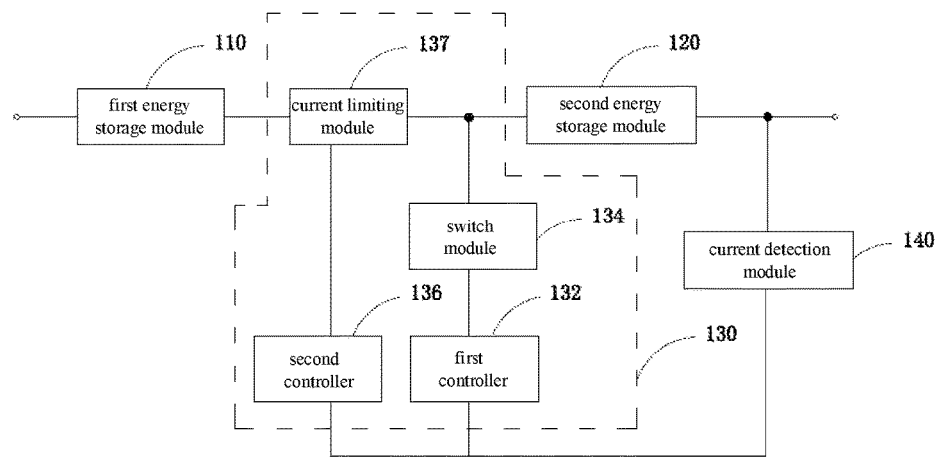
FIG. 4 is an illustrational view of a DC to DC converter circuit made in accordance to a further embodiment of the FIG. 1.

FIG. 4 is an illustrational view of a DC to DC converter circuit made in accordance to a further embodiment of the FIG. 1

Referring to FIG. 4, the embodiment provides a DC to DC converter circuit, which comprises: a first energy storage module 110, a second energy storage module 120, a current regulator module 130, and a current detection module 140. Specifically, the current regulator module 130 comprises a first controller 132, a switch module 134, a second controller 136 and a switch module 137.

The first energy storage module 110, the second energy storage module 120, the current regulator module 130, the current detection module 140, the first controller 132, the switch module 134, the second controller 136 and the switch module 137 as shown in FIG. 4, are the same as which shown in FIGS. 1-3, therefore no additional description is given here below.

In the preferred embodiment to be described here below, changing the switching frequency and regulating the peak value of outputting current of the first energy storage module to control the value of outputting current of DC to DC converter circuit When the value of outputting current of the second energy storage module 120 is less than a predetermined threshold value, the current detection module 140 outputs a first feedback signal treated as the feedback signal; the first controller 132 receives the first feedback signal and increases the switching frequency of the switch module 134 in accordance with the first feedback signal, so as to control the first energy storage module 110 to reduce its charging and discharging time, then the peak value of outputting current of the first energy storage module 110 can be reduced; the second controller 136 receives the second feedback signal and turns on a current limiting module allowed less peak value of current to pass through than the existing one, so as to reduce the peak value of outputting current of the first energy storage module 110 via the current limiting module. I.e., increasing the switching frequency f in formula (1) resulted in reducing the peak value of outputting current $I_{pk}$ of the first energy storage module, then $$Ipk - Vi \times \frac{D}{2Lf}$$

is reduced, and the current limiting module further reduces the peak value of outputting current $I_{pk}$ of the first energy storage module, then $$Ipk - Vi \times \frac{D}{2Lf}$$

is further reduced, so as to reduce the value of outputting current $I_o$ of DC to DC converter circuit.

When the value of outputting current of the second energy storage module 120 is larger than a predetermined threshold value, the current detection module 140 outputs a second feedback signal treated as the feedback signal; the first controller 132 receives the second feedback signal and reduces the switching frequency of the switch module 134 in accordance with the second feedback signal, so as to control the first energy storage module 110 to increase its charging and discharging time, then the peak value of outputting current of the first energy storage module 110 can be increased; the second controller 136 receives the second feedback signal and turns on a current limiting module allowed large peak value of current to pass through than the existing one, so as to increase the peak value of outputting current of the first energy storage module 110 via the current limiting module. I.e., reducing the switching frequency f in formula (1) resulted in increasing the peak value of outputting current $I_{pk}$ of the first energy storage module, then $$Ipk - Vi \times \frac{D}{2Lf}$$

is increased, and the current limiting module further increases the peak value of outputting current $I_{pk}$ of the first energy storage module, then $$Ipk - Vi \times \frac{D}{2Lf}$$

is further increased so as to increase the value of outputting current $I_o$ of DC to DC converter circuit.

When the value of outputting current of the second energy storage module 120 is equal to the predetermined threshold value, the current detection module 140 outputs a third feedback signal treated as the feedback signal; the first controller 132 receives the third feedback signal and remains the switching frequency of the switch module 134 in accordance with the third feedback signal, so as to control the first energy storage module 110 to keep its charging and discharging time unchanged, then the peak value of outputting current of the first energy storage module 110 can remain unchanged; the second controller 136 receives the third feedback signal and remains to turn on the existing current limiting module in accordance with the third feedback signal, so as to remain the peak value of outputting current of the first energy storage module 110 via the current limiting module unchanged. I.e., the switching frequency f in formula (1) remains unchanged and the peak value of outputting current $I_{pk}$ of the first energy storage module keeps unchanged, so as to keep the value of outputting current $I_o$ of DC to DC converter circuit unchanged.

Figure 5:
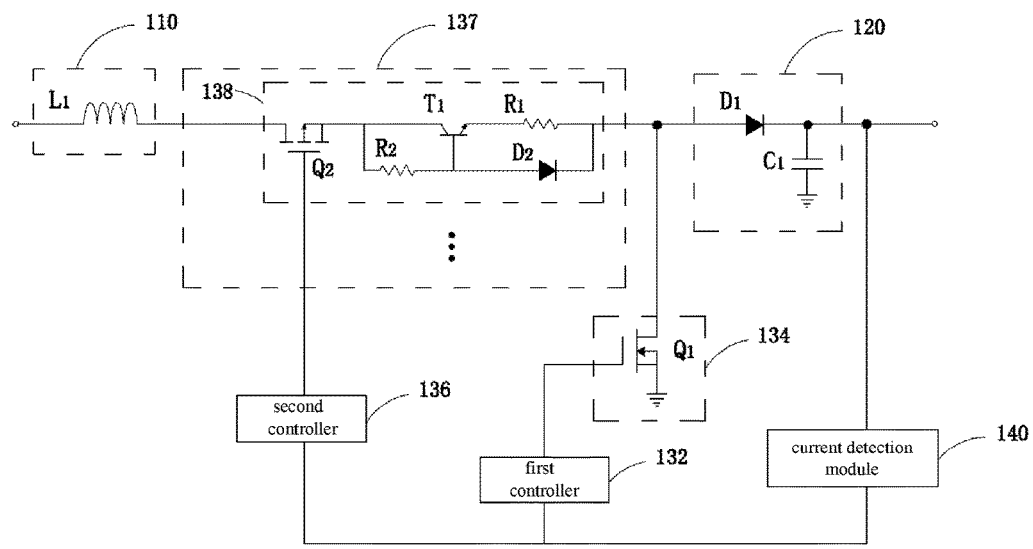
FIG. 5 is an illustrational view of a DC to DC converter circuit made in accordance to a specific example of the FIG. 4.

FIG. 5 is an illustrative view of a DC to DC converter circuit made in accordance to a specific example of the FIG. 4;

Referring to FIG. 5, the first energy storage module 110 comprises an inductor $L_1$, and a first connecting port of the inductor $L_1$ receives an inputting DC voltage. It should be noticed that, the first energy storage module of the embodiment is merely exemplary, it can be achieved by other energy storage modules The second energy storage module 120 comprises a first Zener diode $D_1$ and a capacitor $C_1$; an anode of the first Zener diode $D_1$ is connected to a second connecting port of the inductor $L_1$; and a first connecting port of the capacitor $C_1$ is connected to a cathode of the first Zener diode $D_1$ and a second connecting port of the capacitor $C_1$ is connected to a ground. It should be noticed that, the second energy storage module of the embodiment is merely exemplary, it can be achieved by other energy storage modules The switch module comprises a first field effect transistor $Q_1$. Preferably, the first field effect transistor $Q_1$ is n-channel depletion-mode field effect transistor; the second controller 136 is connected to a gate of the first field effect transistor $Q_1$ to control the first field effect transistor $Q_1$ to be turn on or off; and a drain of the first field effect transistor $Q_1$ is connected to the anode of the first Zener diode $D_1$, a source of the first field effect transistor $Q_1$ is connected to a ground. It should be noticed that, the switch module of the embodiment is merely exemplary, it can be achieved by other switch modules The current limiting module 137 comprises a plurality of current limiting units 138. Basic structure of any one of the current limiting unit 138 will be detailedly described here below.

The current limiting unit 138 comprises a second field effect transistor $Q_2$, a first resistor $R_1$, a second resistor $R_2$, a first transistor $T_1$ and a second Zener diode $D_2$; the second controller 136 is connected to a gate of the second field effect transistor $Q_2$ to control the second field effect transistor $Q_2$ to be turned on or off; a source of the second field effect transistor $Q_2$ is connected to the second connecting port of the inductor $L_1$; a drain of the second field effect transistor $Q_2$ is connected to a first connecting port of the second resistor $R_2$ and a collector of the first transistor $T_1$; a second connecting port of the second resistor $R_2$ is connected to a base of the first transistor $T_1$ and an anode of the second Zener diode $D_2$; an emitter of the first transistor $T_1$ is connected to a first connecting port of the first resistor $R_1$; and a second connecting port of the first resistor $R_1$ is connected to a cathode of the second Zener diode $D_2$ and an anode of the first Zener diode $D_1$. It should be noticed that, the current limiting unit of the embodiment is merely exemplary, it can be achieved by other switch modules It should be noticed that, different current limiting units can allow different peak values to pass through, by setting parameters of including components.

Adopting the DC to DC converter circuit of the embodiment of the present invention, by the current detection module detecting the value of outputting current of the second energy storage module and sending feedback signals, the current regulator module receives the feedback signals and regulates the peak value of outputting current of the first energy storage module in accordance with the feedback signals. Thereby achieving the purpose of controlling the values of the outputting current and improving the efficiency and stability.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A direct current to direct current converter circuit which comprises: a first energy storage module, a second energy storage module, a current regulator module, and a current detection module;

the first energy storage module outputting current via the second energy storage module;

the current detection module detecting the value of outputting current of the second energy storage module, and sending feedback signals in accordance with the value of outputting current of the second energy storage module;

the current regulator module receiving the feedback signals, and regulating a peak value of outputting current of the first energy storage module in accordance with the feedback signals;

wherein the current regulator module comprises a first controller and a switch module; a first connecting port of the switch module connected to an input of the second energy storage module and a second connecting port of the switch module connected to a ground;

and wherein the first controller receives the feedback signals and further controls the switching frequency of the switch module in accordance with the feedback signals, so as to control the charging and discharging time of the first energy storage module to regulate the peak value of outputting current of the first energy storage module.

2. The direct current to direct current converter circuit as recited in claim 1, wherein when the value of outputting current of the second energy storage module is less than a predetermined threshold value, then the current detection module outputs a first feedback signal treated as the feedback signal;

and wherein the first controller receives the first feedback signal and increases the switching frequency of the switch module in accordance with the first feedback signal, so as to control the first energy storage module to reduce its charging and discharging time, and the peak value of outputting current of the first energy storage module can be reduced.

3. The direct current to direct current converter circuit as recited in claim 1, wherein when the value of outputting current of the second energy storage module is larger than a predetermined threshold value, then the current detection module outputs a second feedback signal treated as the feedback signal;

and wherein the first controller receives the second feedback signal and reduces the switching frequency of the switch module in accordance with the second feedback signal, so as to control the first energy storage module to increase its charging and discharging time, and the peak value of outputting current of the first energy storage module can be increased.

4. The direct current to direct current converter circuit as recited in claim 1, wherein when the value of outputting current of the second energy storage module is equal to a predetermined threshold value, then the current detection module outputs a third feedback signal treated as the feedback signal;

and wherein the first controller receives the third feedback signal and remains the switching frequency of the switch module unchanged in accordance with the third feedback signal, so as to control the first energy storage module to keep its charging and discharging time unchanged, and the peak value of outputting current of the first energy storage module can be remained unchanged.

5. A direct current to direct current converter circuit, which comprises: a first energy storage module, a second energy storage module, a current regulator module, and a current detection module;

the first energy storage module outputting current via the second energy storage module;

the current detection module detecting the value of outputting current of the second energy storage module, and sending feedback signals in accordance with the value of outputting current of the second energy storage module;

the current regulator module receiving the feedback signals, and regulating a peak value of outputting current of the first energy storage module in accordance with the feedback signals;

wherein the current regulator module comprises a second controller and a current limiting module, and the current limiting module is interposed between the first and second energy storage modules;

and wherein the second controller receives the feedback signals and further controls the current limiting module to regulate the peak value of outputting current of the first energy storage module in accordance with the feedback signals.

6. The direct current to direct current converter circuit as recited in claim 1, wherein the current regulator module comprises a second controller and a current limiting module, and the current limiting module is interposed between the first and second energy storage modules;

and wherein the second controller receives the feedback signals and further controls the current limiting module to regulate the peak value of outputting current of the first energy storage module in accordance with the feedback signals.

7. The direct current to direct current converter circuit as recited in claim 5, wherein when the value of outputting current of the second energy storage module is less than a predetermined threshold value, then the current detection module outputs a first feedback signal treated as the feedback signal;

and wherein the second controller receives the first feedback signal and the current limiting module reduces the peak value of outputting current of the first energy storage module in accordance with the first feedback signal.

8. The direct current to direct current converter circuit as recited in claim 6, wherein when the value of outputting current of the second energy storage module is less than a predetermined threshold value, then the current detection module outputs a first feedback signal treated as the feedback signal;

and wherein the second controller receives the first feedback signal and the current limiting module reduces the peak value of outputting current of the first energy storage module in accordance with the first feedback signal.

9. The direct current to direct current converter circuit as recited in claim 5, wherein when the value of outputting current of the second energy storage module is larger than a predetermined threshold value, then the current detection module outputs a second feedback signal treated as the feedback signal;

and wherein the second controller receives the second feedback signal and the current limiting module increases the peak value of outputting current of the first energy storage module in accordance with the second feedback signal.

10. The direct current to direct current converter circuit as recited in claim 6, wherein when the value of outputting current of the second energy storage module is larger than a predetermined threshold value, then the current detection module outputs a second feedback signal treated as the feedback signal;

and wherein the second controller receives the second feedback signal and the current limiting module increases the peak value of outputting current of the first energy storage module in accordance with the second feedback signal.

11. The direct current to direct current converter circuit as recited in claim 5, wherein when the value of outputting current of the second energy storage module is equal to the predetermined threshold value, then the current detection module outputs a third feedback signal treated as the feedback signal;

and wherein the second controller receives the third feedback signal and the current limiting module remains the peak value of outputting current of the first energy storage module in accordance with the third feedback signal.

12. The direct current to direct current converter circuit as recited in claim 6, wherein when the value of outputting current of the second energy storage module is equal to the predetermined threshold value, then the current detection module outputs a third feedback signal treated as the feedback signal;

and wherein the second controller receives the third feedback signal and the current limiting module remains the peak value of outputting current of the first energy storage module in accordance with the third feedback signal.

13. A direct current to direct current converter circuit, which comprises: a first energy storage module, a second energy storage module, a current regulator module, and a current detection module;

the first energy storage module outputting current via the second energy storage module;

the current detection module detecting the value of outputting current of the second energy storage module, and sending feedback signals in accordance with the value of outputting current of the second energy storage module;

the current regulator module receiving the feedback signals, and regulating a peak value of outputting current of the first energy storage module in accordance with the feedback signals;

wherein the second energy storage module comprises a first Zener diode and a capacitor;

an anode of the first Zener diode connected to the output of the first energy storage module;

a first connecting port of the capacitor connected to the anode of the first Zener diode and a second connecting port of the capacitor connected to a ground.

14. The direct current to direct current converter circuit as recited in claim 5, wherein the current limiting module comprises a plurality of current limiting units; the second controller turning on one of the plurality of current limiting units in accordance with the feedback signals and turning off others, so as to regulate the peak value of outputting current of the first energy storage module; different current limiting units can allow different peak values to pass through;

each current limiting module having a first connecting port and a second connecting port, and the first connecting port of each current limiting module connected to an output of the first energy storage module and the second connecting port of each current limiting module connected to an input of the second energy storage module.

15. The direct current to direct current converter circuit as recited in claim 6, wherein the current limiting module comprises a plurality of current limiting units; the second controller turning on one of the plurality of current limiting units in accordance with the feedback signals and turning off others, so as to regulate the peak value of outputting current of the first energy storage module; different current limiting units can allow different peak values to pass through;

each current limiting module having a first connecting port and a second connecting port, and the first connecting port of each current limiting module connected to an output of the first energy storage module and the second connecting port of each current limiting module connected to an input of the second energy storage module.

16. The direct current to direct current converter circuit as recited in claim 14, wherein any of the current limiting unit comprises a second field effect transistor, a first resistor, a second resistor, a transistor and a second Zener diode;

the second controller connected to a gate of the second field effect transistor to control the second field effect transistor to be turned on or off; a source of the second field effect transistor connected to an output of the first energy storage module; a drain of the second field effect transistor connected to a first connecting port of the second resistor and a collector of the transistor; a second connecting port of the second resistor connected to a base of the transistor and an anode of the second Zener diode; an emitter of the transistor connected to a first connecting port of the first resistor; and a second connecting port of the first resistor connected to a cathode of the second Zener diode and an input of the storage second module.

17. The direct current to direct current converter circuit as recited in claim 15, wherein any of the current limiting unit comprises a second field effect transistor, a first resistor, a second resistor, a transistor and a second Zener diode;

the second controller connected to a gate of the second field effect transistor to control the second field effect transistor to be turned on or off; a source of the second field effect transistor connected to an output of the first energy storage module; a drain of the second field effect transistor connected to a first connecting port of the second resistor and a collector of the transistor; a second connecting port of the second resistor connected to a base of the transistor and an anode of the second Zener diode; an emitter of the transistor connected to a first connecting port of the first resistor; and a second connecting port of the first resistor connected to a cathode of the second Zener diode and an input of the storage second module.

\* \* \* \* \*